F. A. RYTHER.
BALING PRESS.
APPLICATION FILED DEC. 23, 1909.
965,750.
Patented July 26, 1910.
4 SHEETS—SHEET 3.
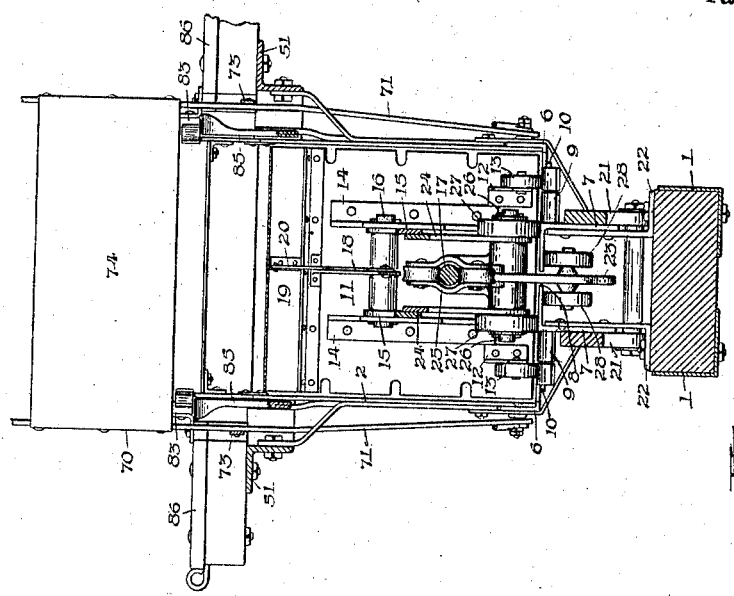
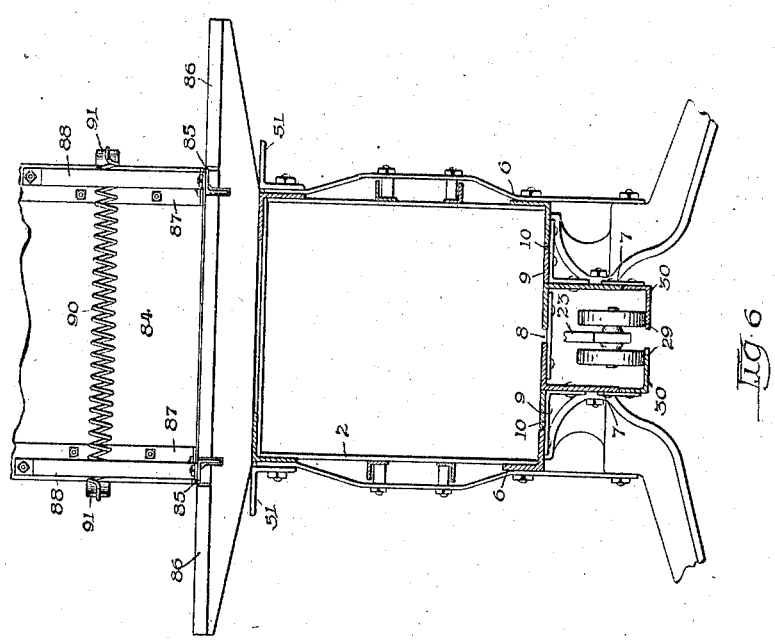
Witnesses:
Inventor:
Frank A. Ryther
By E. W. Burgess
Attorney

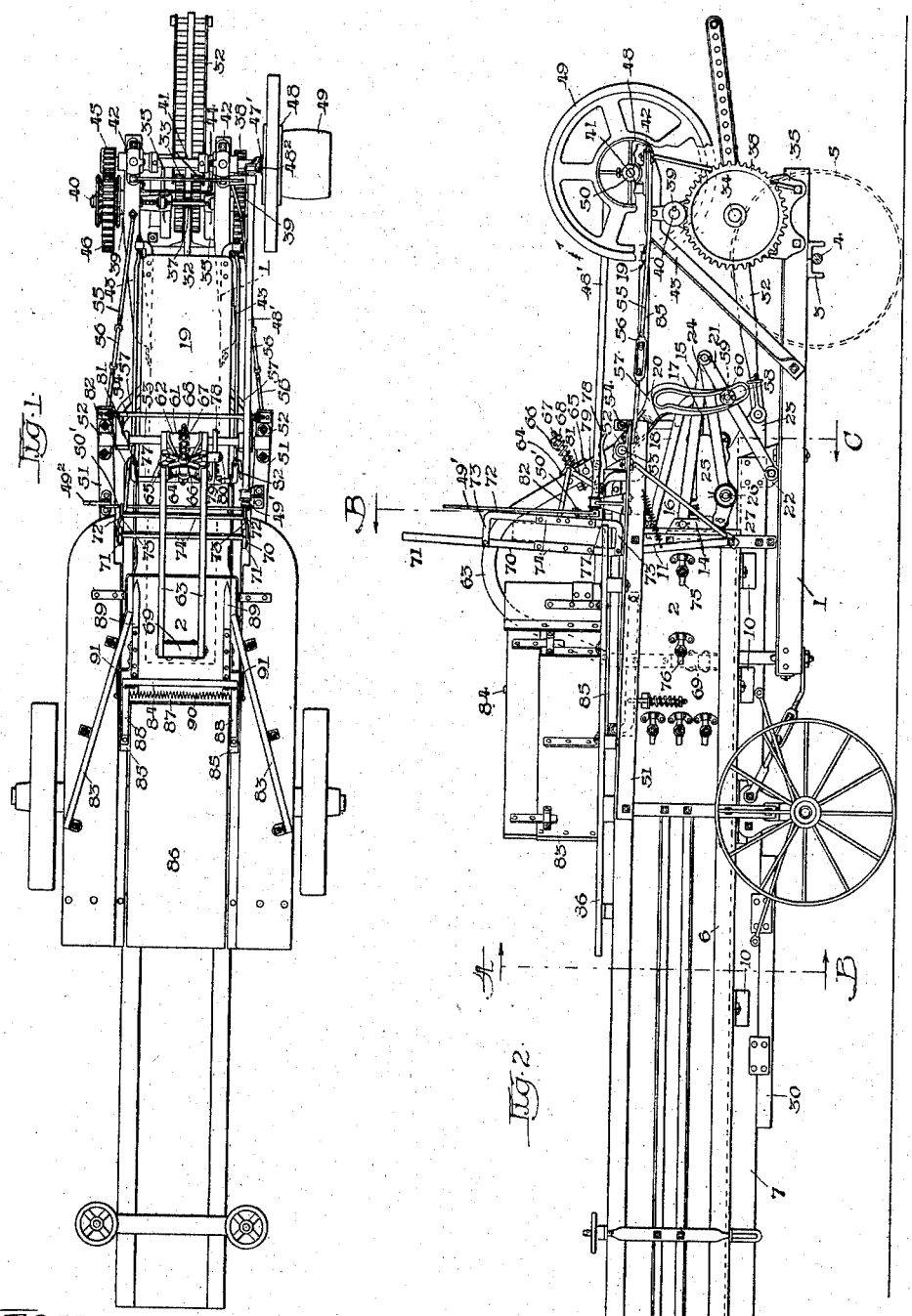

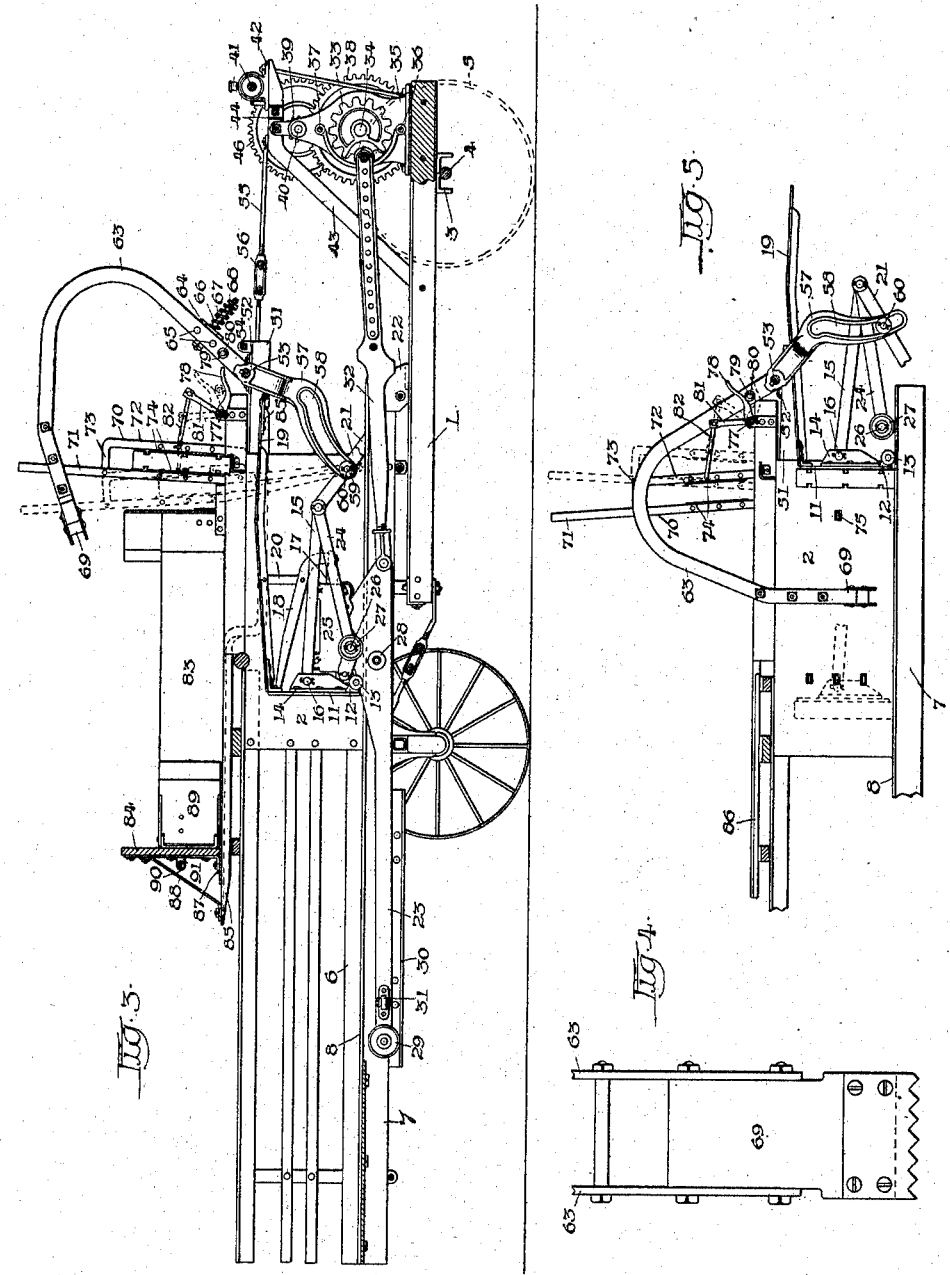

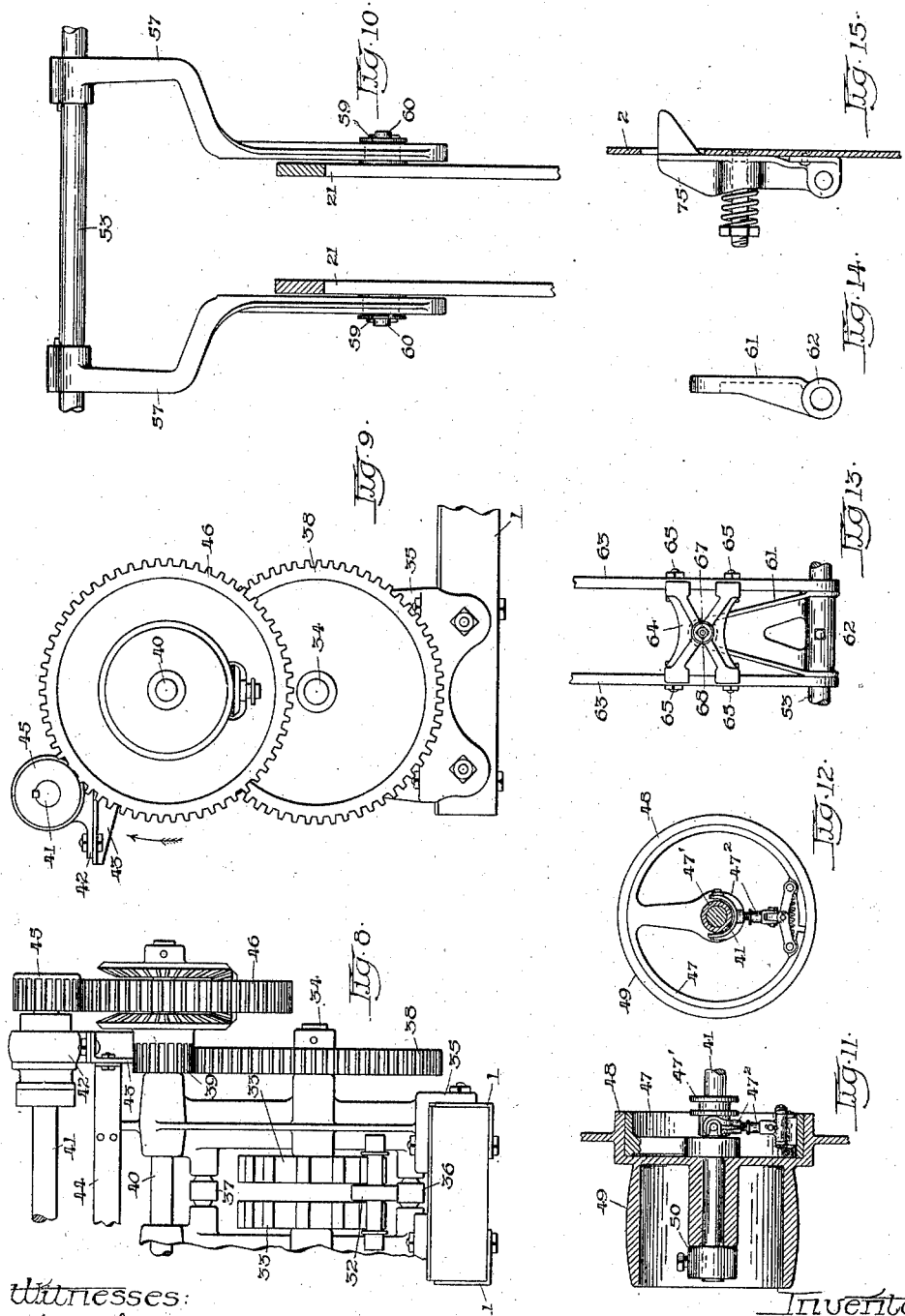

UNITED STATES PATENT OFFICE.

FRANK A. RYTHER, OF CHICAGO, ILLINOIS, ASSIGNOR TO INTERNATIONAL HARVESTER COMPANY, A CORPORATION OF NEW JERSEY.

BALING-PRESS.

965,750.  Specification of Letters Patent. Patented July 26, 1910.

Application filed December 23, 1909. Serial No. 534,572.

*To all whom it may concern:*

Be it known that I, FRANK A. RYTHER, a citizen of the United States, residing at Chicago, in the county of Cook and State of Illinois, have invented certain new and useful Improvements in Baling-Presses, of which the following is a specification.

My invention relates in particular to the construction of the self-feeding mechanism and to the block inserting device when controlled in its operation by a moving part of the self-feeding mechanism; also to the construction of the power transmitting means forming a part of what is commonly called a belt power press and its connection with the self-feeding mechanism; the object of my invention being to provide a baling press that will have few parts, strong and durable and efficient in operation.

I attain these objects by means of the mechanism illustrated in the accompanying drawings, in which—

Figure 1 is a top plan view of a baling press embodying my invention; Fig. 2 is a side elevation of Fig. 1; Fig. 3 is a longitudinal vertical section of Fig. 1; Fig. 4 is an enlarged detached detail showing the manner of constructing the feeder head; Fig. 5 is a detached side elevation of part of the self-feeding means, showing the connection of the block inserting mechanism therewith; Fig. 6 is an enlarged vertical cross section along the line A—B of Fig. 2; Fig. 7 is an enlarged vertical cross section of Fig. 2 along the line B—C; Fig. 8 is a detached view of part of the power transmitting mechanism; Fig. 9 is a side elevation of Fig. 8; Fig. 10 is a detached detail showing the manner of connecting the feeder mechanism with the toggle connections of the presser head; Fig. 11 is a detail of part of the clutch mechanism, shown in section, forming a part of the power transmitting means; Fig. 12 is an end elevation of Fig. 11; Fig. 13 is a detail of the self-feeder mechanism designed to show the yielding connection between the feeder arms and the power transmitting shaft; Fig. 14 is a side elevation of part of Fig. 13; Fig. 15 is a detached detail representing one of the retaining dogs connected with the baling chamber.

The same reference numerals designate like parts throughout the several views.

1 represents longitudinally arranged base frame members upon opposite sides of the machine and upon which the rear end of the press chamber 2 is mounted; 3 a cross member of the bed frame; 4 an axle, and 5 carrying wheels mounted thereon and supporting the rear end of the base frame.

The bottom of the press chamber includes corner angle bars 6 and centrally arranged angle bars 7, having their upper horizontal webs spaced apart, forming a longitudinal slot 8, plates 9 and angle bars 10, which are connected with the plates and support the bars 6 and 7.

The presser head includes a plate 11, having secured to its lower corners ear portions 12, in which are secured studs, upon which are journaled rollers 13. At the center of the plate is secured a pair of vertical angle members 14 spaced apart and receiving between them the forward end of a plunger bar 15, and 16 designates a pin that pivotally connects the bar with the angle members. Below the plunger, and near the bottom edge of the plate is rigidly secured the forward end of a rearwardly projecting stem 17, having its rear end connected with the upper edge of the plate by means of a rigid brace member 18, the stem and the brace forming, with the plate, a triangle, of which the stem is the base.

19 represents a shield having its forward end secured to the presser head and its rear end supported by means of a bar 20, having its upper end secured to the shield and its lower end to the brace member 18.

21 represents toggle members having their lower ends pivotally connected with depending plates 22 secured to the rear ends of angle bars 7 and their upper ends with the rear end of the plunger bar 15 in a manner forming a toggle connection between the plunger bar and the base frame. A push bar 23 extends forwardly below the press chamber, having its rear end pivotally connected with the upper ends of the toggle members 21 and to the rear end of the plunger bar 15 by means of links 24. The rear end of the push bar is turned upwardly, and to its upturned end is secured a guide block 25, that is adapted to move longitudinally along the stem 17.

Journaled upon laterally projecting studs 26, secured to the guide block, are wheels 27 that roll upon the upper side of the bottom of the press chamber, and other wheels 28 are journaled upon the bar in a manner to roll upon the under side of said bottom. The push bar projects forward under the baling chamber, and 29 represents wheels journaled upon horizontal bearings upon opposite sides thereof at its forward end, that roll upon a supplemental track comprising angle sills 30 secured to bars 7, and 31 represents other wheels journaled upon vertical bearings that roll upon bars 7 and are adapted to resist a side pressure of the push bar at its forward end.

32 represents a rack bar having its forward end pivotally connected with the push bar and its rear end engaging with power pinions 33 secured to the inner ends of axially alined shafts 34 journaled in vertical standards 35 arranged upon opposite sides of the rack bar and having their lower ends secured to the base frame members. The rear end of the rack bar is caused to move in an orbital path relative to the pinions, and 36 and 37 represent rollers below and above the rack bar, respectively, and operative to limit the extent of its movement in a vertical plane, the rollers being journaled upon short shafts connected with the oppositely disposed standards.

Secured to the outer ends of shafts 34 are gear wheels 38 that are driven by means of pinions 39 upon a cross shaft 40, journaled near the upper ends of the standards. Motion is transmitted to shaft 40 through a second cross shaft 41 journaled in bearings 42 secured to the rear ends of gear frame members 43 that are secured to the upper ends of the standards and are inclined forward and downward and secured at their lower ends to the base frame.

44 represents a cross bar connecting the upper ends of the standards with each other. Secured to one end of cross shaft 41 is a pinion 45 that meshes with a gear wheel 46 loosely mounted upon shaft 40 and having a common form of differential gear connection with the shaft and one of the pinions 39. Upon the opposite end of the shaft there is secured a friction clutch mechanism including a split ring 47 adapted to engage with internal ring portion 48 forming a part of a combined fly wheel and pulley 49, loosely journaled to the shaft and held in place by means of a collar 50, the clutch being controlled by means of a sliding sleeve $47^1$ connected with a common form of toggle mechanism $47^2$ operative to expand or contract the split ring at the will of the operator by means of a longitudinally arranged rock shaft $48^1$ having a fork $48^2$ secured to its rear end that engages with sleeve $47^1$ and a hand lever $49^1$ at its opposite end, and $49^2$ represents a supplemental hand lever pivotally connected at its lower end with the press frame, the two levers being connected by means of a link $50^1$ in a manner permitting the clutch shifting mechanism to be operated from either side of the machine.

Upon opposite sides of the press chamber, secured to the upper longitudinal frame members, are angle bars 51 that extend in rear of the chamber, having secured to their rear ends bearing boxes 52, in which is journaled a rock shaft 53, and 54 represents a tie rod connection between the ends of the bars.

55 represents stay rods connecting the rear ends of bars 51 with the gear frame, and 56 represents turn buckles operative to adjust the length thereof.

Keyed to opposite ends of the rock shaft 53, adjacent the bearing boxes, are curved arms 57 that project downward and are provided with cam slots 58 adapted to receive rollers 59 mounted upon studs 60 secured to the toggle members 21 upon opposite sides of the machine.

61 represents an arm having a long sleeve portion 62 secured to the rock shaft intermediate the curved arms 57.

63 represents curved feeder arms loosely mounted at their rear ends upon the rock shaft at opposite ends of the sleeve 62 and connected by means of a cross tie member 64, to which the arms are secured by means of bolts 65. The cross tie member is held yieldingly in contact with the forward end of arm 61 by means of a compression spring 66 surrounding a bolt 67 passing through the two members and having an adjusting nut 68 threaded thereon. The feeder arms are curved in a manner to operate above the press chamber and to receive at their forward ends a feeder head 69 adapted to be projected into the feed chamber in advance of the forward movement of the presser head.

70 represents a division block controlling mechanism, including vertically arranged arms 71 pivotally connected at their lower ends with base frame members 6 of the press chamber upon opposite sides of the machine, the arms extending upward above the chamber at a distance to be convenient for the operator to swing them about their pivots.

72 represents vertically arranged bracket members having horizontally arranged legs 73 secured to the arms, and 74 represents transverse separate plates having their opposite ends secured to the arms and bracket and spaced apart in a manner to form a cage open at its ends for the reception of a division block from either side of the machine, and open at the bottom to allow the block to fall when the cage is moved forward above the feed chamber. When the cage is moved forward over the feed chamber the division block will drop down upon the shield 19 and be supported thereby until the presser head is drawn rearward beyond the cage and the block is free to enter the chamber and is held in vertical position between the presser head and spring pressed dogs 75 mounted upon the side walls of the feed chamber, and when the presser head is caused to advance in said chamber it causes the block to move forward with it, and the second pair of dogs 76 prevents it from returning with the head. In order to prevent a forward movement of the division block cage when the presser head is not in position to receive the block, there is provided a cage-locking means including a transverse rock shaft 77 journaled upon the press chamber in rear of the cage and having an arm 78 secured thereto that extends rearward and is adapted to contact with a roller 79 journaled upon a stud 80 secured to one of the feeder arms in a manner to prevent any rocking movement of the shaft until the presser head is advanced and the feeder head raised above the feed chamber. The rock shaft is provided with crank arms 81 at opposite ends thereof that are connected with the cage by means of links 82.

A condenser is provided to coöperate with the self-feeder, including fixed side walls 83 upon opposite sides of the machine that are parallel with the sides of the feed opening for a part of their length and then diverge outward and rearward.

84 represents a movable condenser head secured to the bars 85 that slide in ways provided for them in the receiving platform 86, the securing means including knee brackets 87 and brace members 88. Hinged to the condenser head, on vertical pivots at opposite ends thereof, are swinging members 89 that extend rearward and are formed at their rear ends in a manner to slide closely against the inner surface of the fixed walls. The swinging members are yieldingly held in contact with the fixed members by means of a tension spring 90, having its opposite ends connected with brackets 91 that have their rear ends secured to the swinging members. The sliding bars 85 have a part thereof, toward their rear ends, dropped to a lower plane than that of the receiving table, and are secured at their rear ends to the shield 19.

In operation the presser head is given a reciprocatory movement through its connection with the rack and power transmitting gears, and the movable member of the condenser being connected with the presser head shield, it is thereby caused to move simultaneously therewith in a manner to present the material in a position to be engaged by the feeder head; the movement of the latter being controlled by the presser head toggle operating mechanism, it enters the feed chamber in advance of the presser head and is withdrawn as the latter advances.

What I claim as my invention, and desire to secure by Letters Patent, is:

1. A baling press including, in combination, a feed chamber, a presser head, a presser head operating bar, a toggle mechanism including swinging bars having one end connected with a fixed part of the machine, their opposite ends connected with said presser head and said presser head operating bar, a self-feeding mechanism, and operative connections between said self-feeding mechanism and said swinging toggle bars.

2. A baling press including, in combination, a feed chamber, a presser head, a presser head operating bar, a toggle mechanism including swinging bars having one end connected with a fixed part of the machine and their opposite ends with said presser head and said presser head operating bar, a self-feeding mechanism including a rock shaft mounted above said feed chamber, feeder bars yieldingly secured to said rock shaft, depending arms secured to said rock shaft, the said depending arms being provided with cam slots, and rollers mounted upon said swinging toggle bars and operatively received by said cam slots.

3. A baling press including, in combination, a feed chamber, a presser head, a presser head operating bar, a toggle mechanism including swinging bars having one end connected with a fixed part of the machine and their opposite ends with said presser head and said presser head operating bar, a self-feeding mechanism operatively connected with said swinging toggle bar, a division block cage adapted to swing above said feed chamber, and locking devices controlled by the movement of said self-feeding mechanism and operative to prevent a swinging movement of said cage at predetermined intervals.

4. A baling press including, in combination, a feed chamber, a presser head, a presser head operating bar, a toggle mechanism operatively connecting said presser head with said bar, a self-feeding mechanism including rocking feeder arms, said self-feeding mechanism having operative connections with said toggle mechanism, a division block cage adapted to swing above said feed chamber, a cage locking device connected therewith, and means carried by one of said feeder arms and operative to control a movement of the said locking device.

5. A baling press including, in combination, a feed chamber, a presser head, a presser head operating bar, a toggle mechanism operatively connecting said presser head with said bar, a self-feeding mechanism including rocking feeder arms, said feeding mechanism having operative connections with said toggle mechanism, a division block cage adapted to swing above said feed chamber, a rock shaft mounted upon said feed chamber, a pair of crank arms at opposite ends thereof, said crank arms being connected with said cage by means of links, an arm secured to said rock shaft intermediate said cranks, a roller mounted upon one of said feeder arms and adapted to engage with said arm in a manner to control a movement of said rock shaft.

6. A baling press including, in combination, a feed chamber, a base frame supporting said chamber, a presser head, a presser head operating push bar, a toggle mechanism operatively connecting said head with said push bar, a rack bar having one end pivotally connected with said push bar, pinions engaging with the opposite end of said rack bar in a manner giving it an orbital motion around said pinions, said pinions being secured to the inner ends of axially alining shafts mounted in standards secured to the opposite sides of said base frame, gear members secured to opposite ends of said shafts, a transverse shaft mounted upon said standards and having a differential gear mechanism connecting them with said gear members, a second transverse shaft mounted upon said standards, having at one end a pinion engaging with said differential gear mechanism and at its opposite end a power transmitting pulley loosely mounted thereon, a clutch mechanism adapted to operatively connect said pulley with said shaft, a clutch controlling mechanism including a longitudinally arranged rock shaft, levers mounted upon opposite sides of the feed chamber and connected with said shaft in a manner to control a movement thereof.

FRANK A. RYTHER.

Witnesses:
J. H. CONNERS,
E. J. TEUFEL.